(12) United States Patent
Edeler et al.

(10) Patent No.: US 11,161,721 B2
(45) Date of Patent: Nov. 2, 2021

(54) METHOD FOR ASCERTAINING THE LOAD CAPACITY OF A CRANE AND CRANE

(71) Applicant: Manitowoc Crane Group France SAS, Dardilly (FR)

(72) Inventors: Christoph Edeler, Oldenburg (DE); Frank Richter, Wilhelmshaven (DE); Frank C. Schnittker, Wuerzburg (DE)

(73) Assignee: Manitowoc Crane Group France SAS, Dardilly (FR)

( * ) Notice: Subject to any disclaimer, the term of this patent is extended or adjusted under 35 U.S.C. 154(b) by 197 days.

(21) Appl. No.: 15/454,641

(22) Filed: Mar. 9, 2017

(65) Prior Publication Data
US 2017/0260029 A1    Sep. 14, 2017

(30) Foreign Application Priority Data

Mar. 10, 2016  (DE) .......................... 102016104358.3

(51) Int. Cl.
| | |
|---|---|
| *B66C 13/00* | (2006.01) |
| *B66C 13/16* | (2006.01) |
| *B66C 23/90* | (2006.01) |
| *B66C 23/88* | (2006.01) |
| *G01M 99/00* | (2011.01) |
| *G07C 5/08* | (2006.01) |
| *B66C 23/36* | (2006.01) |

(52) U.S. Cl.
CPC .............. *B66C 13/16* (2013.01); *B66C 23/88* (2013.01); *B66C 23/905* (2013.01); *G01M 99/005* (2013.01); *G07C 5/085* (2013.01); *G07C 5/0816* (2013.01); *B66C 23/36* (2013.01)

(58) Field of Classification Search
None
See application file for complete search history.

(56) References Cited

U.S. PATENT DOCUMENTS 5,730,305 A  *  3/1998  Ichiba ................... B66C 23/905
                                                   212/276
6,170,681 B1 *  1/2001  Yoshimatsu .......... B66C 23/905
                                                   212/278
(Continued)

FOREIGN PATENT DOCUMENTS

| CN | 101348216 A | 1/2009 |
| CN | 101780927 A | 7/2010 |

(Continued)

OTHER PUBLICATIONS

European Search Report issued by ISA/EPO in connection with EP17156459 dated Aug. 15, 2017.
(Continued)

*Primary Examiner* — Jonathan M Dager
(74) *Attorney, Agent, or Firm* — Klintworth & Rozenblat IP LLP

(57) ABSTRACT

A method for ascertaining the load capacity of a functional element of a crane, the load capacity of a sub-assembly of a crane or the load capacity of a crane, wherein: a maximum bearing load is calculated for a specifically occurring configuration and/or specifically occurring state parameters and/or specifically occurring operating parameters on the basis of a predetermined formula; and the calculation is verified on the basis of stored bearing load values.

9 Claims, 6 Drawing Sheets

(56) References Cited

U.S. PATENT DOCUMENTS

| | | | | |
|---|---|---|---|---|
| 6,744,372 | B1* | 6/2004 | Shaw | B66C 13/44 |
| | | | | 212/276 |
| 8,355,847 | B2* | 1/2013 | Colwell | E02F 3/432 |
| | | | | 701/50 |
| 8,527,158 | B2* | 9/2013 | Faivre | E02F 9/265 |
| | | | | 701/50 |
| 8,620,536 | B2* | 12/2013 | Colwell | E02F 9/2029 |
| | | | | 701/50 |
| 8,977,445 | B2* | 3/2015 | Buettner | E02F 9/264 |
| | | | | 701/50 |
| 9,243,923 | B2* | 1/2016 | Sugihara | G01C 21/3407 |
| 9,303,388 | B2* | 4/2016 | Mori | E02F 9/0866 |
| 9,304,501 | B2* | 4/2016 | Danko | B25J 9/1628 |
| 9,529,347 | B2* | 12/2016 | Roach | G05B 15/02 |
| 9,540,789 | B2* | 1/2017 | Urbanowicz | E02F 9/123 |
| 9,752,298 | B2* | 9/2017 | Nakamura | E02F 9/2029 |
| 10,597,266 | B2* | 3/2020 | Wiest | B66C 23/905 |
| 2002/0013666 | A1 | 1/2002 | Schmid | B66C 23/905 |
| | | | | 702/42 |
| 2007/0050115 | A1* | 3/2007 | Discenzo | B66C 13/063 |
| | | | | 701/50 |
| 2008/0004898 | A1* | 1/2008 | Hubler | B66C 23/905 |
| | | | | 703/7 |
| 2008/0249679 | A1* | 10/2008 | Matsuda | E02F 9/26 |
| | | | | 701/29.1 |
| 2009/0276126 | A1* | 11/2009 | Morath | B66C 23/905 |
| | | | | 701/50 |
| 2011/0076130 | A1* | 3/2011 | Stocker | B66C 19/002 |
| | | | | 414/815 |
| 2011/0278252 | A1* | 11/2011 | De Carvalho Cal | B66C 13/16 |
| | | | | 212/279 |
| 2012/0101694 | A1* | 4/2012 | Morath | B66C 23/905 |
| | | | | 701/50 |
| 2012/0312767 | A1* | 12/2012 | Bohnacker | B66C 23/82 |
| | | | | 212/276 |
| 2013/0024077 | A1* | 1/2013 | Abel | B66C 23/905 |
| | | | | 701/50 |
| 2013/0087522 | A1* | 4/2013 | Jung | B66C 23/905 |
| | | | | 212/278 |
| 2013/0345938 | A1* | 12/2013 | Ruoss | B66C 13/18 |
| | | | | 701/50 |
| 2014/0116975 | A1* | 5/2014 | Benton | B66C 23/88 |
| | | | | 212/302 |
| 2014/0202971 | A1* | 7/2014 | Bosco | B66C 23/185 |
| | | | | 212/296 |
| 2014/0224755 | A1* | 8/2014 | Eriksson | G01C 9/08 |
| | | | | 212/273 |
| 2015/0375970 | A1* | 12/2015 | Eidenberger | B66C 13/48 |
| | | | | 212/312 |
| 2015/0375971 | A1* | 12/2015 | Henkel | B66C 15/00 |
| | | | | 700/275 |
| 2016/0289047 | A1* | 10/2016 | Albinger | B66C 13/16 |
| 2017/0036894 | A1* | 2/2017 | Braun | B66C 13/16 |
| 2017/0158470 | A1* | 6/2017 | Miyazaki | B66C 23/62 |
| 2017/0210604 | A1* | 7/2017 | Downing | B66C 23/68 |
| 2017/0217737 | A1* | 8/2017 | Rudy | G06T 7/0004 |
| 2017/0334686 | A1* | 11/2017 | Hess | B66C 23/905 |
| 2017/0334687 | A1* | 11/2017 | Wiest | B66C 15/065 |
| 2017/0369286 | A1* | 12/2017 | Windbacher | B66C 13/16 |
| 2018/0057318 | A1* | 3/2018 | Benton | B66C 13/46 |
| 2018/0179030 | A1* | 6/2018 | Nysse | B66C 13/16 |
| 2018/0222730 | A1* | 8/2018 | Henkel | B66C 23/84 |
| 2018/0229976 | A1* | 8/2018 | Kawai | B66D 1/46 |
| 2019/0062130 | A1* | 2/2019 | Benton | B66C 13/18 |

FOREIGN PATENT DOCUMENTS

| | | |
|---|---|---|
| CN | 102020201 A | 4/2011 |
| CN | 102464272 A | 5/2012 |
| CN | 102514550 A | 6/2012 |
| CN | 102556867 A | 7/2012 |
| DE | 2820353 A1 | 11/1978 |
| DE | 19931302 A1 | 1/2001 |
| DE | 202006017730 U1 | 4/2008 |
| DE | 102014105618 A1 | 10/2015 |
| DE | 102015006992 A1 | 12/2015 |
| EP | 1748021 A2 | 1/2007 |
| EP | 2674384 A1 | 12/2013 |
| EP | 2815353 A1 | 12/2014 |
| JP | 2007297169 A | 11/2007 |
| WO | 9007465 A1 | 7/1990 |
| WO | 2015162096 A1 | 10/2015 |

OTHER PUBLICATIONS

SIPO Office Action dated Oct. 22, 2018 issued in connection with corresponding Chinese Pat. Appl. No. 201710137806.9.

* cited by examiner

| Radius (m) | Boom strength (t) |
|---|---|
| 6.0 | 60.2 |
| 7.0 | 55.2 |
| 8.0 | 50.7 |
| 9.0 | 46.8 |
| 10.0 | 43.3 |
| 11.0 | 40.3 |
| 12.0 | 37.2 |
| 13.0 | 34.9 |
| 14.0 | 32.5 |
| 15.0 | 30.7 |
| 16.0 | 28.8 |
| 18.0 | 25.8 |
| 20.0 | 23.2 |
| 22.0 | 21.2 |
| 24.0 | 19.4 |
| 25.7 | 18.3 |

| Radius (m) | superstructure (t) |
|---|---|
| 3.0 | 65.1 |
| 4.0 | 65.1 |
| 5.0 | 64.1 |
| 6.0 | 60.2 |
| 7.0 | 55.2 |
| 8.0 | 49.0 |
| 9.0 | 42.8 |
| 10.0 | 37.9 |
| 11.0 | 33.8 |
| 12.0 | 30.5 |
| 13.0 | 27.6 |
| 14.0 | 25.1 |
| 15.0 | 22.9 |
| 16.0 | 21.0 |
| 18.0 | 17.9 |
| 20.0 | 15.4 |
| 22.0 | 13.3 |
| 24.0 | 11.7 |

METHOD FOR ASCERTAINING THE LOAD CAPACITY OF A CRANE AND CRANE

CROSS-REFERENCE TO RELATED APPLICATION

This application claims priority under 35 U.S.C. 119(a) to German Patent Application No. 10 2016 104 358.3, filed on Mar. 10, 2016, the disclosure of which is incorporated fully by reference herein.

FIELD

The invention relates to a method for securely ascertaining the load capacity of a crane and for monitoring the safety of a crane, and to a crane which can perform said method and can for example comprise a variable supporting base. The invention also relates to calculating a three-dimensional work curve and ascertaining the permissible speeds when functional elements of the crane are moved.

BACKGROUND

The load capacity of a crane is composed of multiple sub-assembly-specific individual load capacities or the threshold exposures of various crane components or crane sub-assemblies. Some threshold exposures can be ascertained relatively easily on the basis of a few parameters or are constant for a number of states; other threshold exposures are influenced by a multitude of parameters and can often be pre-ascertained only with some difficulty. The threshold exposures or threshold curves which are easily ascertained are often dependent on one parameter only and can for example be pre-ascertained as a two-dimensional threshold curve and stored in a memory. This memory can be accessed as required, and it is possible to read out from the memory the assigned, pre-calculated maximum bearing load for the respectively currently or specifically occurring parameter.

If, however, there are a larger number of crane sub-assemblies which can assume different states or can be configured in part independently of each other, then indicating threshold curves or generally sub-assembly-specific maximum exposure thresholds for the overall crane, which can be configured in a multitude of ways, becomes problematic. If, for example, a first sub-assembly has n1 possible configurations, a second sub-assembly has n2 possible configurations and a third sub-assembly has n3 possible configurations, then this results in a total of n1*n2*n3 configurations for the crane as a whole. If one of the possible configurations cannot be realised as a discrete number of different states but rather for example in an infinitely variable way, for example if one or all of the support members can be extended in an infinitely variable way, then this results in a theoretically infinite number of crane configurations, in which case it is then impossible to pre-indicate an overall load capacity of the crane, for the respective given configuration state, for all possible crane states. Even for the support member sub-assembly alone, it is not possible to pre-determine and store a sub-assembly-specific load capacity for all possible configurations.

While it would be possible to indicate a safety working range for individual crane sub-assemblies which specifies the load capacity for particular discrete states, wherein for example in the case of a crane sub-assembly which can be adjusted in an infinitely variable way, the actual state is ascertained and a load capacity is ascertained for example by interpolating between adjacent sampling points, this approach may however ascertain a bearing load which is too low and thus restrict the employability of the crane too heavily.

The safety of a crane is monitored while the crane is in operation by means of a crane controller. The safety of the crane is ensured as long as various predetermined safety criteria are observed. Possible safety criteria are for example the component strength or load capacity of crane systems, such as the boom, lift cable, load hook, slew ring cylinder and derricking cylinder, as well as the structural integrity of the crane, i.e. preventing the crane from tipping, for example due to the load, wind, a particular slewing angle of the superstructure, etc.

EP 2 674 384 A1 proposes monitoring multiple safety criteria while the crane is in operation, by calculating a permissible specific threshold value while the crane is in operation for each criterion which is dependent on at least one parameter relating to the crane configuration or crane movement while the crane is in operation, and monitoring whether the threshold value is being observed, wherein the step of considering a bearing load table for corresponding criteria is completely omitted.

WO 2015/162096 A1 discloses a method for operating a mobile crane comprising a boom, wherein maximum permissible bearing loads are ascertained for multiple positions within a predetermined range of positions of the boom, a bearing load threshold or bearing load range is ascertained on the basis of a suspended load and on the maximum permissible bearing loads for the multiple positions within the predetermined range of positions of the boom, and the mobile crane is operated in accordance with the bearing load threshold or bearing load range.

DE 10 2015 006 992 A1 discloses a method for calculating relevant data for operating a crane, wherein the system comprises a crane, a communications network and a computer centre, wherein multiple parameters of the crane are initially determined at the crane and transmitted to the computer centre via the communications network, one or more data relevant to operating the crane is/are calculated and selected at the computer centre on the basis of the crane parameters received, and the calculated and selected data relevant to operating the crane are transmitted back to the crane.

It is an object of the present invention to propose a method for ascertaining the load capacity of a crane comprising at least two sub-assemblies.

This object is solved by the subject-matter of the independent claims. Other advantageous embodiments are defined in the dependent claims.

SUMMARY

Functional Element

A functional element is a functional unit of a crane which can perform a particular function, such as for example a boom, lift mechanism, derricking cylinder, support member or counterweight. The state of a functional element can be described or defined by at least one parameter. It is possible for a functional element to have various states (for example, a variable boom has two state parameters: length and boom angle; a support member has the state parameter of length of extension or support breadth) which define the configuration of the functional element, i.e. for example its geometry, for example its length or slewing angle. A crane is usually configured before it is put into operation, such that the state parameters of the functional elements are determined. There is then usually no further reconfiguration during a lift procedure, i.e. the state parameters remain constant.

Individual functional elements can however also assume various states defined by operating parameters (as opposed to state parameters) during operations, i.e. while for example lifting the load. Operating parameters of the lift mechanism include for example the lift height; operating parameters of a support member include for example the support pressure; and operating parameters of the boom include for example the boom angle or tip angle.

A functional element can exhibit a particular or specific strength which indicates the exposure (measured for example in tonnes of lift weight) up to which the functional element remains firm, i.e. for example fail-safe or operationally secure.

A functional element can exhibit a particular or specific stability which indicates the exposure (measured for example in tonnes of lift weight) up to which the functional element remains stable, i.e. does not for example tip or cause the crane to tip.

Strength and stability can then be dependent on the configuration of the functional element (i.e. for example its state parameters) and/or also on its operating parameters, such that different configurations and/or different operating states result in different permissible exposures.

Since a functional element must satisfy the demands on both strength and stability, the load capacity can be ascertained in consideration of the two criteria. Of the maximum load capacity in consideration of strength, and the maximum load capacity in consideration of stability, the lower maximum load capacity is usually chosen as the permissible bearing load. It is optionally also possible to ascertain the load capacity in consideration of strength only. Stability can be monitored in terms of the crane as a whole, i.e. composed of the individual functional elements.

If the functional element has only one state parameter, the load capacity or maximum bearing load can for example be plotted against the state parameter. This can also be referred to as a two-dimensional threshold curve (or threshold exposure and/or range of validity). If the functional element has three or more state parameters, this can also result in three-dimensional or multi-dimensional threshold curves and/or threshold planes.

Sub-Assembly

A sub-assembly contains at least one functional element but can also be composed of two or more functional elements.

Typical sub-assemblies of a crane include: the boom or parts of the boom such as the main boom, the tip extension or the overall boom; the superstructure or parts of the superstructure such as the counterweight, including in consideration of its position, the lift mechanism, the slewing connection or the derricking cylinder; and the undercarriage or parts of the undercarriage such as the outriggers, the drive assembly frame, the centres of gravity, the assembling states, etc.

Like the functional elements, a sub-assembly has a threshold curve which results from the individual sub-assembly-specific threshold curves or load capacities of the sub-assembly constituents. The lowest maximum bearing load of the respective sub-assembly constituents is for example chosen as the permissible bearing load.

A sub-assembly can for example be composed of multiple functional elements, such as for example the superstructure consisting of the derricking cylinder, the lift mechanism, the counterweight and the volume of oil. The volume of oil can oscillate very significantly depending on the operating state, for example the positions of the hydraulic cylinders, and can therefore influence the weight of the superstructure and therefore the overall centre of gravity of the crane. As a parameter, this can be relevant to structural integrity and/or resistance to tipping. Another sub-assembly can be the undercarriage consisting of for example four or more support members which can exhibit various lengths of extension, strengths and support force thresholds which are equal or also independently variable or different from each other.

The following assignment can for example be made:
the boom sub-assembly:
   functional elements: telescopic parts, telescopic cylinders, tip extensions, bracing devices
the superstructure sub-assembly:
   functional elements: turntable (steel construction), derricking cylinder, lift mechanism, slewing connection, counterweight
the undercarriage sub-assembly:
   functional elements: drive assembly frame, outrigger members, outrigger cylinders, tyres Threshold Exposure/Threshold Curve A threshold exposure or threshold curve, including a bearing load curve, indicates (for a functional element, sub-assembly or crane) the maximum bearing load which can/may be lifted in a given configuration, i.e. for example in accordance with the values of the state parameters and optionally also the operating parameters.

One or more threshold exposures or threshold curves can be stored in a memory which is accessed before, while or after the crane is configured for the given current configuration of the crane, in order to read out or ascertain the bearing loads of the functional elements or sub-assemblies of the crane and/or the crane as a whole.

Threshold exposures or threshold curves can also be stored as a number of discrete values, wherein the bearing loads for the respective given configuration can also be ascertained as required by interpolating or extrapolating stored values, as is described for example in EP 1 748 021.

Threshold exposures or threshold curves can also be indicated in part or completely by one or more formulaic relationships and pre-calculated or calculated as required and, if necessary, supplemented with stored threshold exposures or threshold curves.

By means of threshold exposures or threshold curves, it is possible to ascertain the overall load capacity of a crane in its respective configuration, wherein in accordance with the operating parameters of a crane having a fixed configuration, different operating states of the crane can also for example result in different bearing loads. It is also possible for the operating parameters to have no effect on the maximum bearing load of a crane, given a predetermined and constant configuration.

Ascertaining the Bearing Load

In principle, the bearing load or load capacity can be ascertained for a crane on the basis of a calculation using a current configuration of the crane or on the basis of currently occurring parameters for the given state of the crane. Alternatively or additionally, the load capacity of a crane can be ascertained on the basis of one or more pre-ascertained or calculated and stored load capacity values or on the basis of load capacity values of one or more functional elements or sub-assemblies. It is also possible to employ a combination of the two methods, i.e. to ascertain the load capacity of a crane on the basis of pre-stored values and on the basis of a calculation, such as for example a calculation of the load capacity on the basis of a formulaic relationship or also on the basis of an interpolative or extrapolative calculation.

Bearing loads or boom threshold curves for a boom, such as a main boom, which is for example embodied as a telescopic boom can for example be pre-ascertained and stored for each telescopic state. They can be stored for example in the form of an assignment between a maximum bearing load and a radius which can for example be predetermined as a continuous parameter. In a graphic representative, this results in a bearing load curve plotted against the radius. Such a curve can for example be stored for each telescopic state.

If, for example, five telescopic stages with two bolting holes each are provided in the boom, this results in three positions for each telescopic stage (completely retracted, plus two different extended states defined by the bolting holes), such that a total of $3^5=243$ telescopic states or main boom lengths or different configurations are possible. If a boom threshold curve is pre-ascertained and stored for each of these 243 telescopic states, then a total of 243 curves are provided in the memory.

The load capacity or bearing load of the boom can be formulaically represented as:

$$load_{boom} = f_{boom}(tele, radius)$$

Various configurations for the counterweight CW can be stored, wherein ten different configurations may be assumed by way of example.

For the superstructure, the strength for the turntable itself can for example be pre-ascertained and stored, for example as a function of the boom and the counterweight CW. This can be formulaically represented as:

$$load_{turntable} = f_{turntable}(load_{boom}, CW)$$

The strength and overall centre of gravity of the superstructure are dependent on the boom, the counterweight and the turntable, which can be formulaically represented as follows:

$$load_{superstructure} = f_{superstructure}(f_{turntable}(load_{boom}, CW), CW, f_{boom}(tele, radius))$$

The parameters of telescopic state (243 curves, in the example specified above) and counterweight (ten different configurations in accordance with the example) theoretically result in 2430 curves. The current superstructure threshold curve is calculated.

The slewing connection can exhibit a stored threshold curve and can reduce the superstructure load as applicable:

$$load_{slewing\ connection} = f_{slewing\ connection}(load_{superstructure}(tele, radius, CW))$$

This does not however have any effect on the number of stored curves, which in the given example remains at 2430.

An undercarriage comprises n outriggers (typically four, but optionally fewer or more, for example six or eight outriggers) which can be embodied in the form of an outrigger box and outrigger cylinder. Each of the n outriggers exhibits a threshold curve which is dependent on the configuration of the outrigger, i.e. for example its length of extension:

$$load_{Ai} = f(length_{Ai})$$

The undercarriage configuration can thus be specified by n parameters, i.e. for example n=4 parameters.

Each of the n outriggers can for example exhibit three discrete lengths of extension, which would result in $3^4=81$ different combinations, i.e. in this case, there are then 2430×81=196830 permutations.

In order to avoid having to store such a large number of curves, it would for example be possible to only consider and store a predetermined and limited number n of basic outrigger configurations, such as for example just three outrigger configurations, such as for example: all supports extended by 0% (first outrigger configuration); all supports extended by 50% (second outrigger configuration); and all supports extended by 100% (third outrigger configuration). In this case, there are then fewer permutations, i.e. 2430× 3=7290 permutations (in the given example, where n=3).

The undercarriage additionally includes the parameter of slewing angle (slewing of the superstructure relative to the undercarriage). The slewing angle is continuously adjustable. If an angular resolution of 1° is chosen for a panoramic slewing angle of 360°, this results in 360 permutations. If the 2430 curves mentioned in the example embodiment above by way of example are to be stored at an angular resolution of 1°, this results in a total of 360×2430×3=2624400 curves for n=3 outrigger configurations. For technical reasons, however, storing that large a number of curves is problematic and impracticable.

Alternatively or additionally, a full 360° slewing range can for example be considered, wherein a maximum bearing load is then indicated such that it can be borne across the full 360° slewing range, wherein the slewing angle with the smallest maximum bearing load is then definitive, i.e. a maximum bearing load for the slewing angles which could in principle accommodate more bearing load is sacrificed.

Alternatively, the 360° slewing range can also be subdivided, and predetermined slewing angular portions can be defined for which an allowed maximum bearing load can be ascertained and predetermined as a constant. It is for example possible to predetermine m ranges of the same or different sizes, such as for example m=4 ranges at 90° each. Given n outrigger configurations and a sub-division into m ranges, n×m×(possible telescopic states)×(possible counterweight configurations) curves to be stored are obtained, i.e. 3×4×243×10=29160 curves for the examples given above. While this does significantly reduce the number of 2624400 curves indicated above, ascertaining and storing such a large number of curves can however also be technically difficult or problematic in practice, in particular when a boom for example comprises more bolting holes and/or various tips are used during operations.

In accordance with one embodiment of the invention, the load capacity of a crane is ascertained by both making a calculation and accessing pre-stored values, such as for example pre-stored load capacity values of functional elements and/or sub-assemblies.

Within the meaning of the present invention, a calculation is understood to mean that for example a formulaic relationship is known, by means of which it is possible to ascertain or calculate, for specifically occurring state parameters and/or operating parameters of a functional element and/or sub-assembly, how large the maximum load capacity is.

In accordance with one embodiment of the invention, reference data or verification data can be adduced, on the basis of pre-ascertained and stored values, for verifying or checking purposes in order to ascertain whether the ascertained maximum bearing load is for example also plausible, such that the calculated result can be validated or verified.

In order to verify a calculation, selected bearing load curves can for example be stored, such as for example:
  bearing load for 360°, all supports at 100% (completely extended); maximum bearing load (example): 10 t
  bearing load for 360°, all supports identical but extended only partially (for example to 80%); maximum bearing load (example): 9 t optionally, additional bearing loads for 360°, all supports extended only partially (for example to 30%, 50%, etc.); maximum bearing load (example embodiment with supports extended to 50%): 6 t bearing load for 360°, all supports at 0% (completely retracted); maximum bearing load (example): 2 t Additionally, it is also optionally possible to store reference bearing load points for predetermined slewing angles in a predetermined state of extension of the supports. If the angles at which the boom is above a support (i.e. for example 45°, 135°, 225° and 315°) are considered as slewing angles, this generally results in high bearing loads, i.e. bearing loads which in individual applications can exceed the panoramic bearing loads (bearing load for) 360°. The following may be given as an example embodiment (for supports which are for example completely extended, i.e. 4×100%):

bearing load for 45°/135°/225°/315°: equal throughout at 13 t

Where the supports are in the same state (i.e. for example 4×100% extended), it is optionally possible to also ascertain a bearing load for the intermediate states, i.e. for example a bearing load for the slewing angles 0°, 90°, 180° and 270°, at which the boom is situated between the supports, as viewed from above, which generally results in a lower bearing load than in the above example in which the boom is above the support.

A maximum bearing load of 10 t, equal throughout, is given for these states as an example embodiment (as a minimum, as a 360° panoramic load).

Generally, the above bearing load curves or bearing load values can be pre-ascertained and stored for one or more predetermined states of extension of the supports (i.e. for example: all supports retracted; all supports partially extended, such as for example to 10%, 20%, . . . , 90%); and all supports completely extended) as a panoramic bearing load (bearing load for 360°) and/or also for predetermined sectors or individual angles or angular ranges (see previous example: boom above supports or boom between supports).

In addition to the above example, reference bearing load points can also for example be ascertained and stored for only partially extended supports, for example 4×80%, as follows:

bearing load for 45°/135°/225°/315° (boom above support): equal throughout at 11 t bearing load for 90°/270° (boom between supports): bearing load 9 t throughout (minimum, panoramic load)

bearing load for 0°/180° (boom between supports): bearing load 10 t throughout

Pre-ascertaining and storing reference bearing load points for selected states is not used in accordance with the invention to ascertain the bearing load (though this would be possible, if for example one of the states exactly specified therein occurs). These pre-stored values or curves are instead used to verify a calculation. The bearing load is thus not ascertained in accordance with the invention by interpolating or extrapolating on the basis of pre-stored values but instead by a calculation, wherein one or more calculated bearing load values are verified or validated on the basis of pre-stored reference data. The reference data thus do not have any impact or effect on an ascertained numerical value for a maximum bearing load, but are rather merely used to verify the ascertained numerical value, i.e. to assert that it is valid and usable or to assert that it is invalid. In the latter case, a warning signal can for example be outputted and/or the crane can be automatically shut down or stopped.

Example 1

In a current crane configuration, all of the outriggers are completely extended (4×100%). The slewing angle (of the superstructure relative to the undercarriage) measures 35°.

A calculation based on a predetermined formula yields a maximum bearing load of 12.5 t.

In order to verify the calculated value of 12.5 t, reference is made in accordance with the invention to pre-stored reference values, as indicated above by way of example, wherein for verifying purposes, reference is made to one or more pre-stored datasets which are for example as close as possible to the current configuration, i.e. wherein for example individual parameter values match or exhibit a small or minimal deviation from the parameter values occurring, wherein datasets can also be used which exhibit a minimal upward and/or downward deviation from a predetermined parameter value (i.e. the next-larger and/or next-smaller stored value), wherein one or more reference values or comparative values can be ascertained which can be adduced in order to verify the calculated maximum bearing load.

For the example embodiment given above, the reference bearing load point (slewing angle: 45° at 4×100%) can for example be adduced as a first comparative value, which in the above example embodiment exhibits a maximum bearing load of 13 t.

A second nearest pre-stored value lying at the slewing angle 0° and 4×100% has in the above example embodiment been stored with a lower bearing load of 10 t.

Since, as mentioned above, it is known that a maximum bearing load when a slewing angle is above a support (i.e. for example 45°) can be larger (example embodiment: 13 t) than when a slewing angle is between the supports (0°), which is indicated at 10 t, the interval between 10 t and 13 t can be ascertained and indicated as a plausibility interval on the basis of the pre-stored bearing load values, in order to verify whether the calculated maximum bearing load is plausible and can thus be validated.

In the example embodiment, the ascertained bearing load measured 12.5 t and is thus within the interval indicated, such that the calculated bearing load is assumed to be correct.

If the calculation were to yield a value which is not within the interval, it is assumed that an error has occurred, and a shutdown procedure can for example be performed.

Example 2

The current configuration shall be 4×80% (outrigger) and 35° (slewing angle). A calculation yields a bearing load of 10.8 t.

In order to verify this calculation, the following nearest pre-stored datasets can be adduced on the basis of the above example:

4×80% (supports), 45° slewing angle: pre-stored maximum bearing load 11 t

4×80% (supports), 0° slewing angle: pre-stored maximum bearing load 9 t

The calculated current bearing load of 10.8 t is within the interval between 9 t and 11 t and is thus considered to be valid.

In order to be able to perform improved verification, tendencies or gradients of the bearing load values can also be considered, wherein additional information considered is for example that a bearing load is normally greater, the further the supports are extended and is smaller, the further the supports are retracted.

It is noted that the above example embodiment can also be correspondingly adduced for other parameters, wherein it is also always possible to consider information on which states are stable (states or configurations or parameter values with a higher bearing load) and which states or parameter values have a lower bearing load, in order to perform plausibility observations such as the above gradient observation. Comparative intervals have also been given in the above example embodiment only by way of example; it is however also possible to use more finely or more broadly graduated datasets or comparative intervals. Generally, integrity of a calculation is verified more thoroughly, the more finely the pre-stored parameter values are sub-divided.

It is thus possible in accordance with the invention to perform a calculation using relatively simple formulae. This calculation can be verified and validated on the basis of comparatively few pre-stored datasets.

It is therefore no longer necessary to pre-calculate and store a very large multitude of curves and to use these curves directly and/or interpolate between these curves. It is instead possible in accordance with the invention to significantly reduce the number of stored curves, since they are not used for the actual calculation, for example by interpolating, but rather only in order to verify a calculation. Consequently, only a calculation which has been correspondingly validated in accordance with the invention is used as the ascertained bearing load, and not a value which has for example been obtained from an interpolation between pre-stored curves.

BRIEF DESCRIPTION OF THE DRAWINGS

The invention is described on the basis of example embodiments and by referring to the figures. There is shown.

DESCRIPTION

Figure 1:
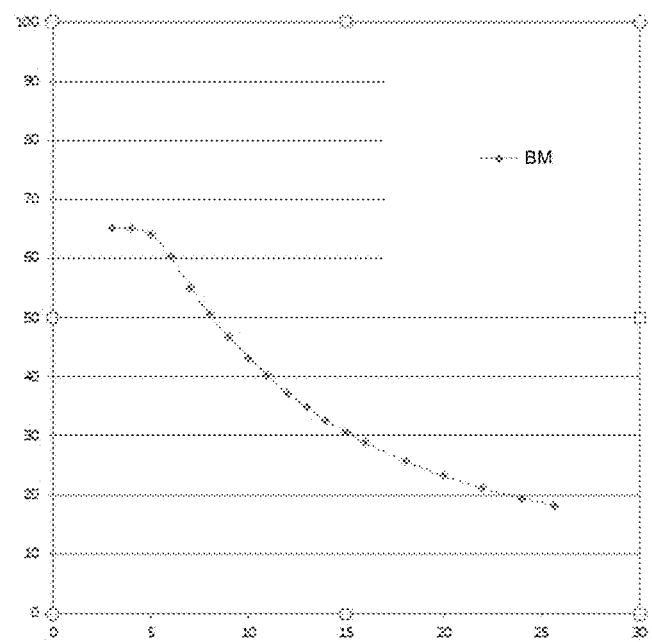
FIG. 1 a two-dimensional load capacity curve of a boom (radius to load capacity)

A boom system can for example have a threshold curve in the form of a two-dimensional parameter set "radius to load capacity" and/or "boom angle to load capacity". These data can for example be calculated and stored in predefined increments, such as for example 1.0 metres for the radius and 1.0° for the angle. It is for example possible to calculate and store a finite number of two-dimensional parameter sets for a finite number of boom lengths and/or telescopic states and optionally combinations with tip lengths, as shown in FIG. 1, wherein the boom length (or radius) is plotted along the X-axis and the maximum bearing load is plotted along the Y-axis. It can for example be read from the pre-calculated threshold curve marked that the maximum load capacity at a boom length of 15 metres measures about 30 tonnes.

The threshold curves for other functional elements or components of the superstructure are normally likewise two-dimensional and can be combined with the threshold curves of the boom to form a resultant two-dimensional parameter set. A finite number $n_G$ of counterweights and $n_A$ boom lengths then for example results in a total of $n_A*n_G$ two-dimensional parameter sets for the superstructure as a whole.

Figure 2:
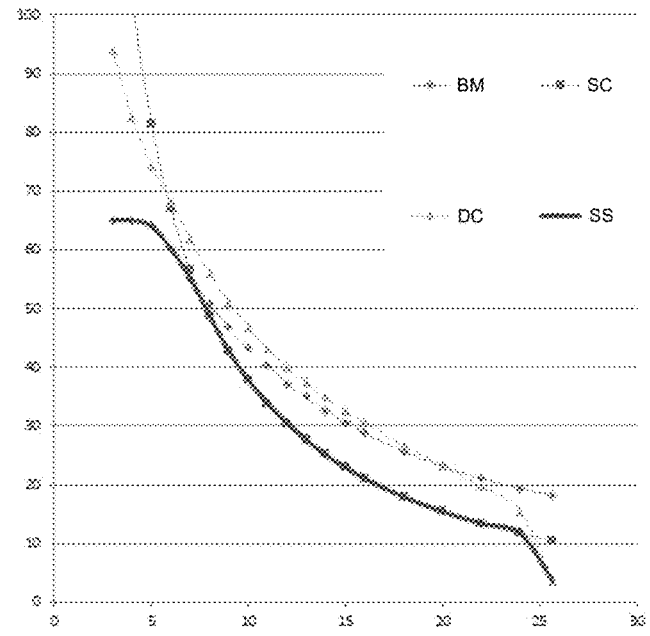
FIG. 2 a threshold curve of the superstructure, based on the threshold curves of boom strength, slewing connection and derricking cylinder.

FIG. 2 shows the bearing load curve for the boom strength BM, already shown in FIG. 1, wherein the threshold curves for the slewing connection SC, the derricking cylinder DC and the superstructure SS (all plotted against the radius of the boom by way of example) are additionally also marked, enabling them to be compared. The derricking cylinder curve can for example also be plotted against the derricking cylinder length. The relationship between the derricking cylinder length and the radius can then again be derived using the crane state. As can be seen from FIG. 2, this results in the lowermost curve marked, as the sub-assembly minimum, being the bearing load curve for the sub-assembly composed of these functional elements, wherein said bearing load curve is for example determined by the boom strength threshold curve up to a boom length of about seven metres. For a boom length in the range of seven metres to about 24 metres, the sub-assembly bearing load curve is determined by the threshold curve of the slewing connection, since the latter permits lower values for the maximum bearing load in the cited range than the other threshold curves. For a value of the boom length above about 24 metres, the sub-assembly bearing load curve is defined by the derricking cylinder threshold curve which exhibits the lowest permissible bearing loads within this range.

The threshold curve for the superstructure, which is shown in FIG. 2, is shown for a constant counterweight by way of example. For a different counterweight, a different threshold curve can be ascertained in the given way.

The threshold curves for the components of the undercarriage can normally likewise be represented by a two-dimensional parameter set, wherein the position of the superstructure relative to the undercarriage (the slewing angle) is excluded as a variable, and a minimum value which is permissible for all positions is pre-ascertained. If there are a multitude of combinations of individual parameters, in particular the length of extension of the support members, this then results in further possible combinations with the superstructure parameter sets. If there are for example four support members S1, S2, S3 and S4, this results in $n_{S1}*n_{S2}*n_{S3}*n_{S4}$ possible combinations with the superstructure parameter sets, wherein an individual parameter $n_S$ can occur in a multitude of finite states or also in an infinite (infinitely variable) number of states, such that a finite or also infinite multitude of combinations results. There are often a limited number of states of the support members (such as for example lengths of extension of 0%, 50% and 100%) and a limited number of combinations (for example: all 0%; all 50%; all 100%; one side 50%, opposite side 100%; etc.).

If there are infinite or infinitely variable permutations for the parameters $n_{S1}$, $n_{S2}$, $n_{S3}$, $n_{S4}$, i.e. if for example the support members can be extended in an infinitely variably way, independently of each other, this results in an infinite number of possible combinations.

If the overall bearing load curve is reduced to a minimum value curve by excluding the variable position of the superstructure relative to the undercarriage (the slewing angle), i.e. the variable "slewing angle" is set to a constant, then ranges—such as for example particular slewing positions of the superstructure relative to the undercarriage which can exhibit higher load capacities—are not optimally utilised.

The load capacity of a crane comprising at least two sub-assemblies, wherein each sub-assembly is specified by at least one parameter, for example an operating parameter and/or a state parameter, is for example ascertained by pre-ascertaining and storing the threshold exposure or threshold curve or maximum bearing load for at least one first sub-assembly which exhibit(s) the lowest number of parameters or the lowest number of possible variations or the lowest gradient (the lowest change in the maximum bearing load when there is a change in one or more state parameters) and reading out the assigned value of the bearing load for the current parameter or parameters, wherein the threshold exposure or maximum bearing load for at least one second sub-assembly having the largest number of parameters or the largest number of possible variations or the highest gradient (the greatest change in the maximum bearing load when there is a change in one or more state parameters) is/are ascertained only as required. It/they is/are ascertained in accordance with requirements on the basis of the currently given combination of operating parameters and/or state parameters and can for example be ascertained by calculation and verifying the calculation on the basis of pre-ascertained and stored values. For this purpose, a formulaic relationship between the maximum bearing load and the state parameters and/or operating parameters can for example be predetermined and stored as a calculation protocol.

A "first sub-assembly" within the above meaning can for example be the superstructure including a boom and a counterweight; a second sub-assembly can for example be the undercarriage comprising outrigger members, the superstructure and the slewing angle of the superstructure.

The load capacity or maximum bearing load of a crane is thus not merely ascertained exclusively on the basis of pre-stored values, but rather pre-stored threshold curves are for example only used if they are threshold curves which are easily stored, i.e. for example two-dimensional threshold curves or three-dimensional threshold curves and, in individual cases, one or more higher-dimensional threshold curves, and/or in order to verify a calculation, for example for the undercarriage. What is however avoided is that high-dimensional or even an infinite number of threshold curves would have to be stored if there are too many parameters to be considered and/or too many possible individual states of one or more parameters. Using only low-dimensional threshold curves in accordance with the invention enables a simple partial solution to the problem of determining the overall load capacity of a crane. For those functional elements or sub-assemblies which can only be described with respect to their maximum bearing load using multi-dimensional threshold curves, a calculation is performed which is based for example on one or more predetermined formulaic relationships or formulae, in order to ascertain an overall bearing load from currently occurring parameter values or parameter combinations, in consideration of the partial bearing loads ascertained from the stored threshold curves, wherein for safety reasons, and as already described, the lowest sub-assembly-specific maximum bearing load is ascertained as the maximum bearing load of the crane. In this case, the sub-assembly which can bear the lowest load in the present configuration determines the permissible maximum bearing load of the crane.

Pre-calculated two-dimensional or three-dimensional threshold curves or maximum sub-assembly-specific bearing loads for the boom system, and optionally also for the derricking cylinder, for the parameters which determine the current configuration can for example be read out from a memory, and these pre-calculated threshold curves or maximum sub-assembly-specific bearing loads can be transmitted to the crane controller.

If threshold curves are read out, the crane controller can then select an assigned, for example two-dimensional threshold curve, for example on the basis of detecting the current configuration of the boom system. The configuration of the boom system can for example be detected by inputting, for example by a user inputting, a corresponding code or generally the corresponding configuration and/or can also be completely or additionally detected by one or more sensors. Sensors can for example be arranged on a boom which transmit the current length of the boom to the crane controller. In parallel with this, or prior or subsequent to this, it is possible to ascertain the relevant state parameters and/or operating parameters on the basis of detecting the components of the superstructure, i.e. including for example in consideration of the counterweight, and on the basis of this, to ascertain the for example two-dimensional threshold curve for the superstructure which is assigned to the configuration and/or parameters or to read it out from a memory. The components or the given configuration can be detected, as described above, by an input, for example an input by a user, and/or by a sensor which is connected to the crane controller or a computational unit. Parameters can also be inputted in relation to desired (subsequent) states of the crane which can presently exhibit a configuration which deviates from this. The parameters in this case are also referred to as specifically occurring (for example inputted) parameters.

The maximum load capacity of the undercarriage can be ascertained on the basis of detecting the configuration or components, in particular the configuration or geometry of the outrigger base of the undercarriage. The operating parameters and/or state parameters used to describe the configuration of the undercarriage can for example be inputted and/or ascertained by sensors. Since the state parameters of the undercarriage, i.e. for example four support members which can be extended and retracted in an infinitely variable way and independently of each other, can assume not only discretely predetermined values in the example described but can assume a theoretically infinite number of values between two predetermined positions (for example a completely retracted support member and a completely extended support member), if for example they can be adjusted in an infinitely variable way, and since multiple support members—for example, four support members—are provided, this theoretically results in an infinite multitude of possible configurations. In accordance with the invention, the maximum bearing load of the undercarriage is calculated for the current configuration only, on the basis of a formulaic relationship which is for example predetermined, wherein it is not necessary to calculate and store all of the possible individual states or possible combinations of different individual states, as it is when pre-calculating and storing in a memory. This calculation can be verified on the basis of pre-stored values.

The calculated threshold exposure or maximum bearing load can then optionally also be ascertained, in consideration of the threshold curve or bearing load—ascertained as described above—for the superstructure-boom system, for a specifically occurring slewing angle between the undercarriage and the superstructure. Optionally, said calculation is made for the entire slewing range between the undercarriage and the superstructure, i.e. the range from 0° to 360°, wherein said calculation can be made in advance or as required, including for example continuously, and a bearing load curve which is dependent on the slewing angle can thus be predetermined. Said calculation can optionally also be made in discrete increments and can for example ascertain—sub-divided in continuous discrete increments, such as for example 1° increments or 5° increments—what the maximum bearing load is for the respectively considered slewing positions.

It is thus possible to calculate a maximum bearing load for any configuration of the outrigger base and for any slewing angles between the superstructure and the undercarriage, and a threshold curve for the crane can for example be indicated on the basis of a plurality of these calculations, wherein the maximum bearing load for different slewing angles of the superstructure relative to the undercarriage can be indicated on the basis of the individual calculations. The only variable parameter of this threshold curve is then the slewing angle; the undercarriage configuration is then assumed to be constant in the given state.

The use of pre-stored threshold curves, which is known in its own right, can therefore be reduced to an expedient amount by pre-calculating and storing said threshold curves only for low-parameter functional elements or sub-assemblies, making it no longer necessary to pre-ascertain and store a high number of threshold curves for all of the possible configurations of the overall system. In the case of functional elements or sub-assemblies, such as a variable outrigger base in the example described, a multitude of threshold curves for considering the different individual positions or combinations are not pre-calculated and stored in accordance with the invention, but rather a calculation is instead performed and said calculation is verified on the basis of (comparatively few) stored datasets. The result can be used to ascertain the overall bearing load, for example in additional consideration of the maximum bearing load of the other functional elements or sub-assemblies of the crane, ascertained from pre-ascertained and stored threshold curves, wherein a new threshold curve can also be calculated which for example exhibits the slewing angle between the superstructure and the undercarriage as its only parameter. This enables the effort involved in pre-determining threshold curves and the memory needed for storage to be reduced on the one hand, and on the other hand enables the overall load capacity of a crane for an overall system having a theoretically infinite number of states or possible combinations to be easily ascertained, and the overall load capacity of the crane to thus be utilised as optimally as possible.

The slewing angle between the undercarriage and the superstructure can for example be detected by means of a sensor and transmitted to the crane controller or a bearing load calculating unit, in order to determine the maximum permissible bearing load for the respectively currently occurring configuration.

In addition to ascertaining the maximum bearing load, it is also possible to ascertain or calculate one or more permissible maximum working speeds, wherein the following aspects can be considered in this respect:
  a) the current utilisation of the threshold load capacity;
  b) the location of the current two-dimensional threshold curve within the three-dimensional threshold curve;
  c) the currently chosen operating mode
  d) reliability of the sensor data of user inputs (validation).

On the basis of ascertaining the load capacity as above, it is possible to determine various operating modes and offer them to a user, as shown by way of example in FIGS. 3 to 6.

Figure 3:
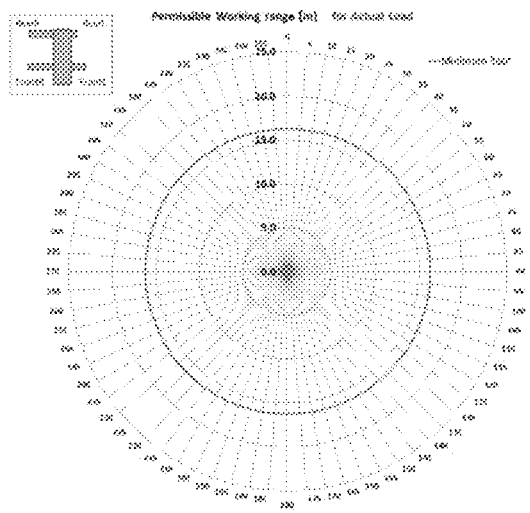
FIG. 3 the "360° table" operating mode.

FIG. 3 shows the "360° table" operating mode, wherein the minimum load capacity from the slewing range as a whole is taken as a basis. It is thus to be expected that a critical state will not arise during slewing. The working speeds do not have to be separately limited.

Figure 4:
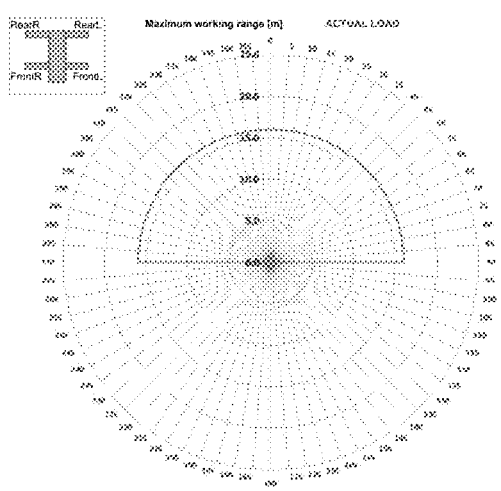
FIG. 4 the "restricted working range" operating mode.
Figure 4:
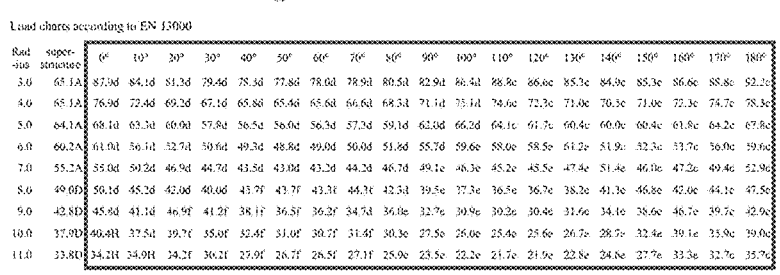

FIG. 4 shows the "restricted working range" operating mode. The working range is pre-limited to a particular range (for example 180° to the rear). The minimum load capacity for the chosen working range is taken as a basis. The shutdown thresholds for slewing are known in advance and independent of bearing load utilisations. When approaching the working range boundary, the speed is reduced in good time and the slewing movement is halted before or at the boundary.

Figure 5:
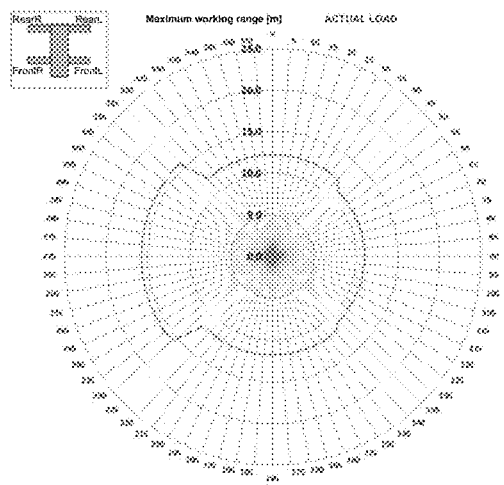
FIG. 5 the "sector-specific load capacities" operating mode.

FIG. 5 shows the "sector-specific load capacities" operating mode. The working range is pre-divided into suitable sectors (for example 180° left/right or 90° above the supports). The minimum load capacity for the individual sectors is ascertained and taken as a basis. The shutdown thresholds for slewing are dependent on bearing load utilisations and have to be ascertained dynamically. A change in the permissible bearing load can however only come to bear at the sector boundaries. The speed thus only has to be separately reduced when approaching the sector boundaries, and as applicable the movement halted before or at the boundary.

Figure 6:
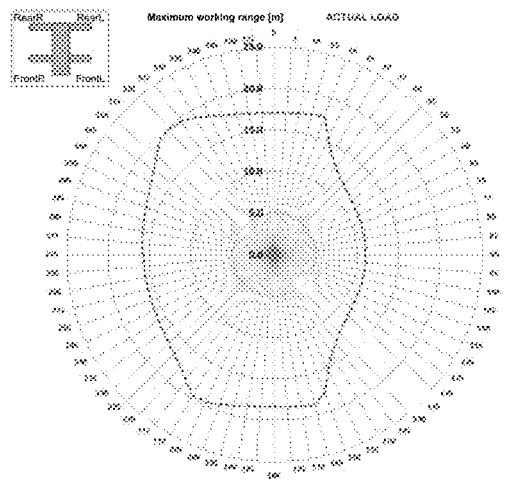
FIG. 6 the "optimised load capacity" operating mode.

FIG. 6 shows the "optimised load capacity" operating mode. The working range is pre-divided into finite sectors (of for example 5° or 10°). The optimum or maximum load capacity for each respective sector is taken as a basis. The shutdown thresholds for slewing are dependent on bearing load utilisations and are ascertained dynamically. A change in the permissible bearing load can come to bear at any time. The speed is thus monitored constantly and can be separately adapted and as applicable reduced as a function of the permissible bearing loads and the current utilisation of the load capacity. At its maximum, the movement can be halted in good time.

Figure 7:
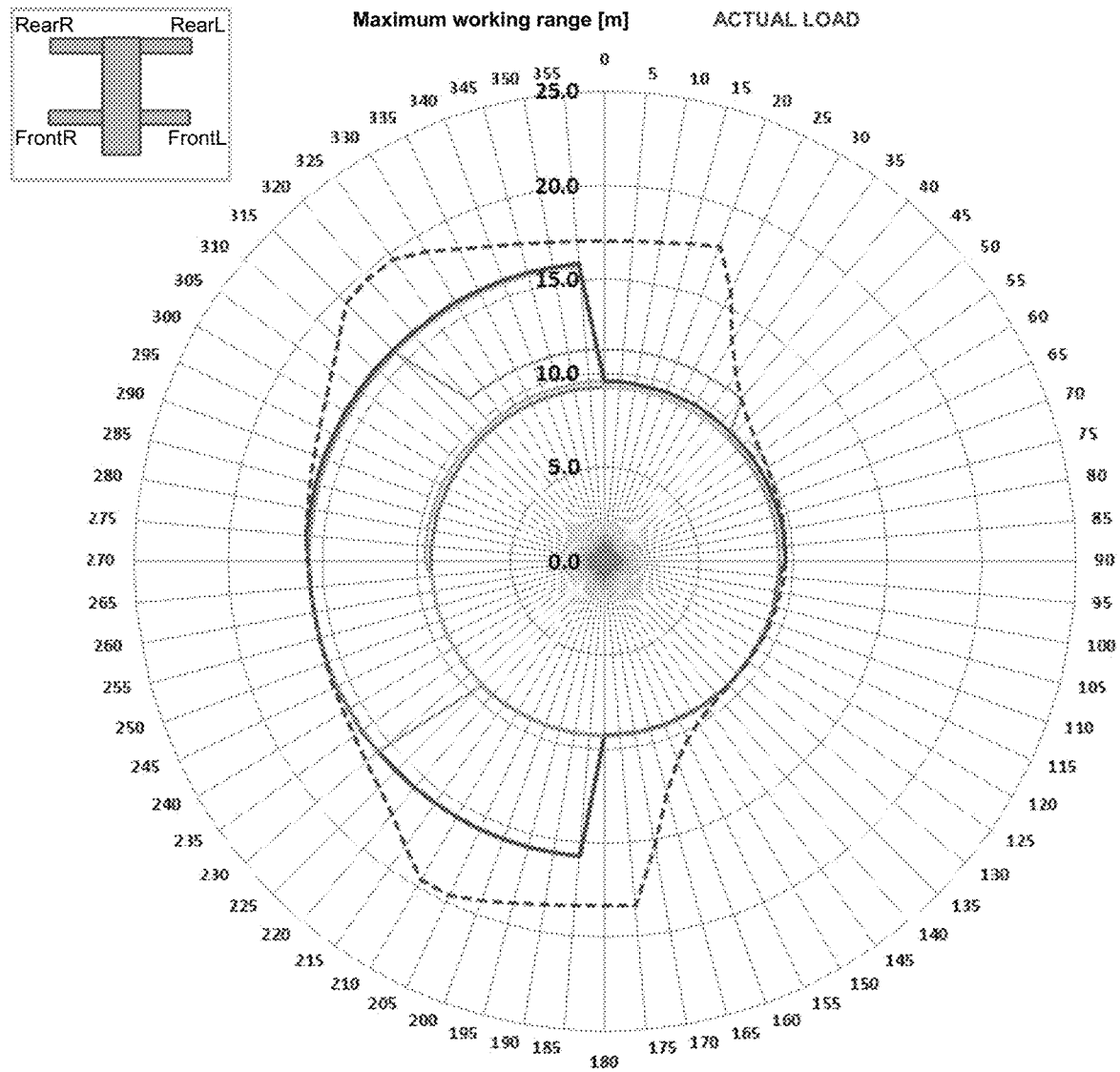
FIG. 7 an operating panel for depicting bearing loads and working ranges.

A three-dimensional load capacity table is thus available at any time, and the operator can choose a corresponding mode in accordance with the work task, as shown for example in FIG. 7. The alternative operating modes can for example be:
  utilising the maximum load capacity/working radii and accepting the reduced speeds and/or limits on the working range/slewing angle;
  working "unrestricted" at higher speeds and accepting reduced load capacities;
  a combination of these two permutations.

In accordance with one sequence by way of example, the following steps are performed:
  Step 1: evaluating the boom configuration sensor values and selecting the corresponding boom strength;
  Step 2: evaluating the "superstructure" sub-assembly configuration sensor values and calculating the strength of the sub-assembly;
  Step 3: evaluating the outrigger sensor values and calculating the 360° curve;
  Step 4: evaluating the slewing angle sensor values and outreach sensor values and ascertaining the permissible bearing load for the current slewing angle;
  Step 5: evaluating the load sensor values and outreach sensor values and ascertaining the currently occurring load;

Step 6: comparing the target and actual values and regulating the maximum permissible speeds, including shutting down dangerous movements.

Figure 8:
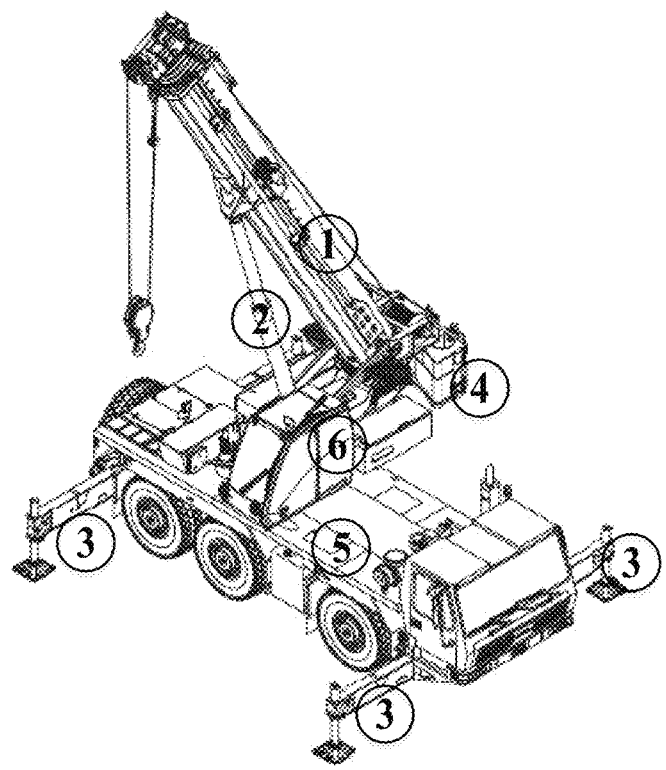
FIG. 8 a crane comprising functional elements.

FIG. 8 shows a crane which can perform the method described above, wherein the crane comprises a telescopic boom 1 which can be set in terms of its pitch by means of the derricking cylinder 2. Support members 3 are provided laterally on the left and right, respectively, on the front and rear side of the mobile crane and can assume any intermediate position between a completely retracted position and a completely extended position. A counterweight 4, which is provided on the superstructure 6 which can be slewed through 360° relative to the undercarriage 5, can assume one of multiple predetermined discrete values from different counterweights.

Figure 9:
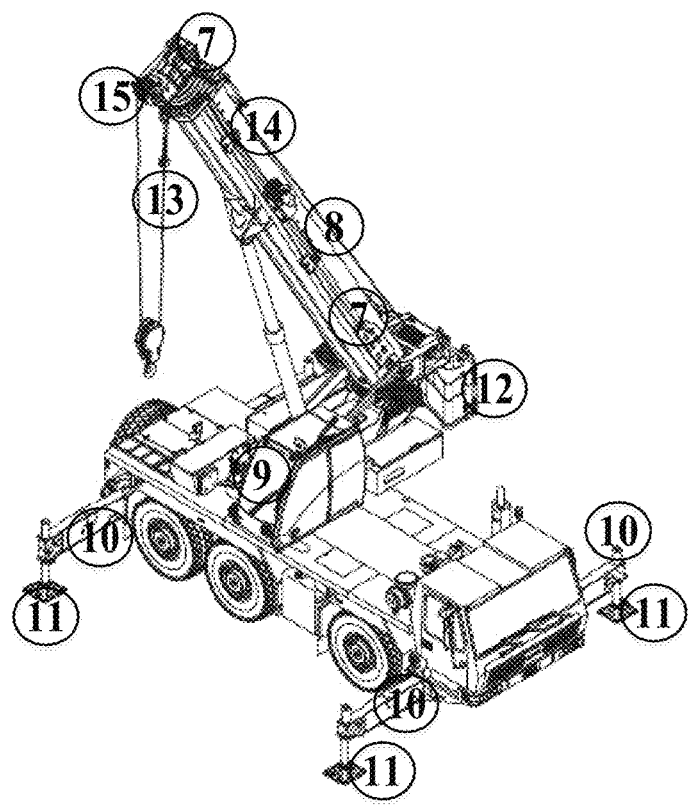
FIG. 9 sensors of the crane in FIG. 8.

FIG. 9 shows the crane depicted in FIG. 8, with sensors marked which can be used individually or in combination to determine the configuration or state parameters or operating parameters of the crane. One or more sensors for determining the boom angle can be provided at the positions marked as 7. A sensor for determining the boom length or the telescopic state of the boom can be provided at the position marked as 8. The region in which a sensor for ascertaining the derricking cylinder pressure and thus the operating state or the derricking cylinder configuration can be provided is denoted by 9. One or more sensors for ascertaining the support breadth can be provided at the points marked as 10, and sensors for ascertaining the support pressure can be provided at the points marked as 11. A sensor for determining the counterweight is denoted by 12, a sensor for determining the cable force is denoted by 13, and a sensor for detecting additional equipment (for example a hose drum for supplying oil to the tip cylinder and/or a tip which is mounted on the boom) is denoted by 14. A sensor for detecting the actual load on the boom can for example be provided at the point marked as 15.

Figure 10:
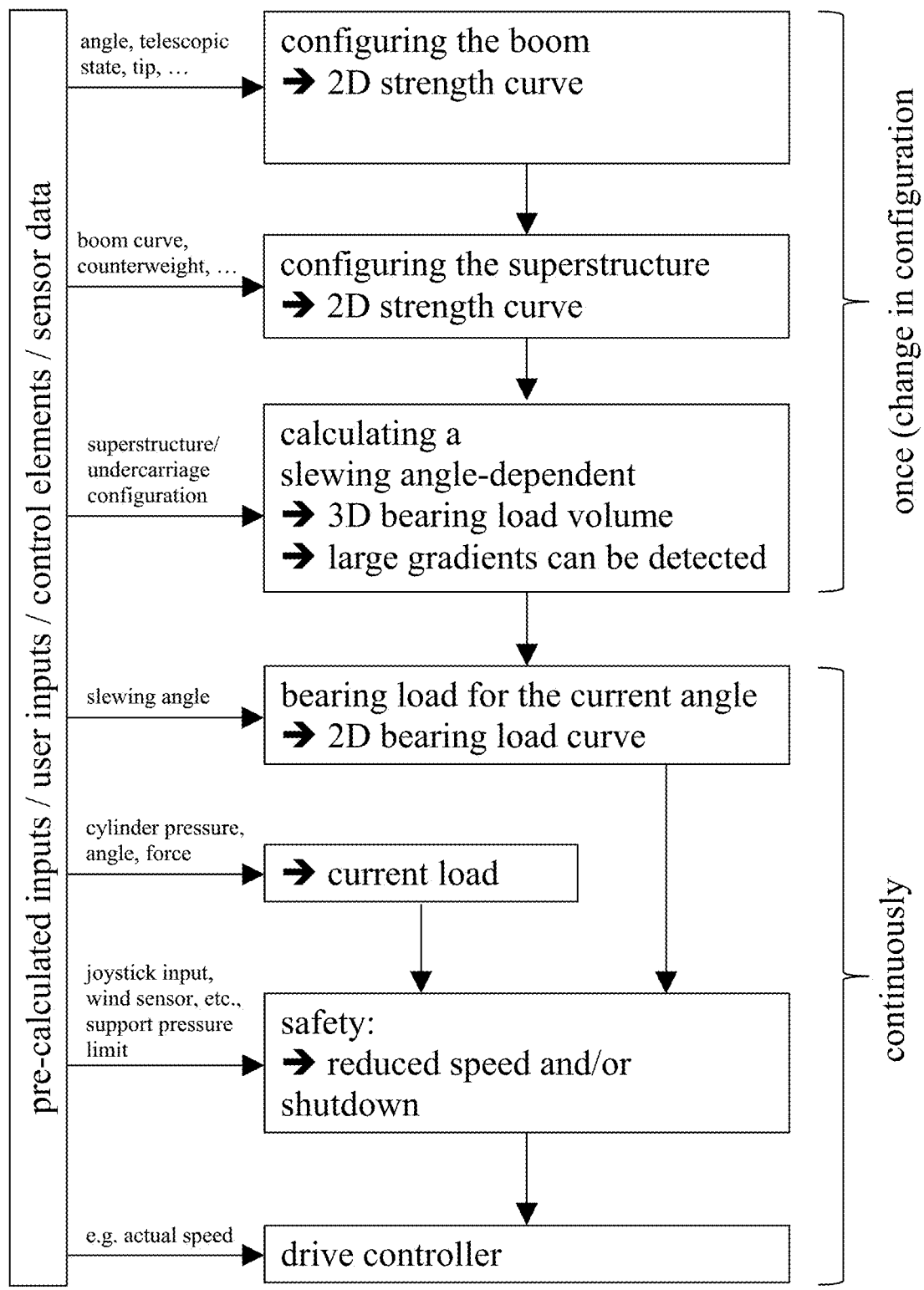
FIG. 10 a flow diagram for calculating bearing load volume.

FIG. 10 shows a flow diagram for calculating a bearing load volume. As shown in the steps at the top of FIG. 10, the configuration is initially determined once when there is a change in the configuration, see the top two steps. The configuration of the boom and the configuration of the superstructure are for example determined, and a strength curve or bearing load curve is ascertained in each case which can be two-dimensional or multi-dimensional. As shown by way of example, state parameters of the boom are (not exhaustively) the angle, the telescopic state and the tip. State parameters of the superstructure are for example (likewise not exhaustively) the curve of the boom, the current counterweight and the state of the lift mechanism. The undercarriage configuration can assume a theoretically infinite number of states due to the variable support breadth of the outriggers, wherein the load capacity is calculated for the specifically occurring state which is for example ascertained automatically on the basis of the sensors, provided on the support members, for determining the respective extended state. In combination with the strength curves of the boom and superstructure which are ascertained from stored values, it is possible to calculate a maximum load capacity which is dependent on the slewing angle, such that a three-dimensional bearing load volume can for example be produced, wherein large gradients can also be detected. In this context, gradients can for example indicate how significantly the bearing load is changed by changing parameters. The latter are very important for safe operations and can also be separately assessed. For particular configurations (for example, all outrigger members retracted), it may be that a bearing load of 15 t is permissible at a given slewing angle of the superstructure of for example 80°. It may then be that at a slewing angle of 75°, the permissible load shrinks to 5 t due to restrictions relating to structural integrity, i.e. the "change in bearing load per change in angle" gradient in this case is $10/5=2.0$ t/°. For dynamic and control-related reasons, however, a certain "precursor angle" is necessary which has to be available for the targeted deceleration of the superstructure. If this precursor angle is 10°, then measures would therefore have to be initiated, at the earliest even at 85°, so that the 5 t point is not exceeded at 75° even when the slewing of the superstructure is braked sharply.

Once the maximum bearing load has been ascertained and calculated once for a present configuration or following a change in the configuration, the subsequent steps can be performed continuously or on an ongoing basis during operations. The respectively permissible maximum bearing load can be determined for the current slewing angle between the superstructure and the undercarriage, which is for example ascertained by means of a slewing angle sensor. This then results in a two-dimensional load-over-radius bearing load curve which for example shows the bearing load for various derricking angles (radii).

In consideration of a measured or inputted current load, which is for example ascertained on the basis of the parameters of cylinder pressure, angle and/or force, a calculation can be made in order to indicate to an operator that the speed should be reduced or the crane should be shut down into a secure mode. This information can also be converted automatically into the actions indicated, wherein for example the output value of a wind sensor and/or a support pressure limit and/or a user input can be considered.

This information can be forwarded to a drive controller in order to operate the crane.

The invention claimed is:

1. A method for ascertaining a load capacity of a crane in a particular configuration, wherein:
    a) the crane comprises at least two sub-assemblies;
    b) the crane exhibits a plurality of possible configurations which are determined by parameters of the sub-assemblies;
    c) the sub-assembly-specific load capacity of the crane is dependent on at least one parameter of the respective sub-assembly;
    d) at least one first sub-assembly is specified by a lowest number of parameters and/or exhibits a lowest number of possible variations of the parameter or parameters and/or exhibits a lowest gradient of the change in the maximum bearing load when there is a change in one or more parameters;
    e) at least one second sub-assembly is specified by a largest number of parameters and/or exhibits a largest number of possible variations of the parameter or parameters and/or exhibits a largest gradient of the change in the maximum bearing load when there is a change in one or more parameters;
    f) the specifically occurring values of the parameters of the at least one first sub-assembly and the at least one second sub-assembly are ascertained in the particular configuration of the crane;
    g) the sub-assembly-specific load capacity of the at least one first sub-assembly is calculated and/or pre-determined and stored as a function of at least one of the parameters of the at least one first sub-assembly and is read out for the specifically occurring value(s) of the parameter(s) from a memory;
    h) the sub-assembly-specific load capacity of the at least one second sub-assembly is calculated from the specifically occurring values of the parameter or parameters of the second sub-assembly, wherein the result of calculating is verified on the basis of one or more stored values, wherein in order to verify the calculation, stored parameter sets which match the specifically occurring parameter values and/or exhibit a minimal upward and/or downward deviation for a respective parameter are adduced; and i) the load capacity of the crane is determined on the basis of the sub-assembly-specific load capacities of the at least one first sub-assembly and the at least one second sub-assembly thus ascertained.

2. The method for ascertaining the load capacity of a crane according to claim 1, wherein the first sub-assembly is a sub-assembly which is dependent on one parameter only.

3. The method for ascertaining the load capacity of a crane according to claim 1, wherein the first sub-assembly is a sub-assembly which is dependent on two parameters at most or three parameters at most.

4. The method for ascertaining the load capacity of a crane according to claim 1, wherein the second sub-assembly is a sub-assembly which is dependent on four or more parameters and/or is an undercarriage comprising support elements which can be extended independently of each other.

5. The method for ascertaining the load capacity of a crane according to claim 1, wherein the second sub-assembly is a sub-assembly which is dependent on at least three parameters or at least four parameters, wherein each parameter of the sub-assembly can be discretely or continuously changed independently of other parameters of the sub-assembly.

6. The method for ascertaining the load capacity of a crane according to claim 1, wherein parameters of a sub-assembly of the at least two sub-assemblies include state parameters for describing the state or determining the configuration or geometry of the sub-assembly and/or operating parameters for describing the operating state.

7. The method for ascertaining the load capacity of a crane according to claim 1, wherein the at least two sub-assemblies are used to perform the method, the at least two sub-assemblies including at least two of: a boom sub-assembly; a derricking cylinder sub-assembly; a support sub-assembly; a counterweight sub-assembly; an undercarriage sub-assembly; and a superstructure sub-assembly.

8. The method for ascertaining the load capacity of a crane according to claim 7, wherein:
the boom sub-assembly is determined by the parameters of boom length and/or boom angle; and/or
the derricking cylinder sub-assembly is determined by the parameter of boom length or optionally boom angle, from kinematics; and/or
the undercarriage sub-assembly comprises of at least four individual support members or individual supports and is determined by the parameter of length of extension and/or the parameter of support force which can be determined independently of each other for each individual support member or each individual support; and/or
the counterweight sub-assembly is determined by the parameter of weight value and location of the centre of gravity; and/or
a crane sub-assembly is determined by the parameters of the boom sub-assembly, the derricking cylinder sub-assembly, the support member sub-assembly, the counterweight sub-assembly and the superstructure sub-assembly.

9. The method for ascertaining the load capacity of a crane according to claim 1, wherein the specifically occurring value of the parameter or parameters of a sub-assembly of the at least two sub-assemblies is ascertained by one or more sensors and/or by manual inputs.

* * * * *